Jan. 17, 1956  J. KONTOS  2,731,089
PROTECTOR FOR FLEXIBLE FITTINGS FOR FLEXIBLE TANKS
Filed Aug. 8, 1952
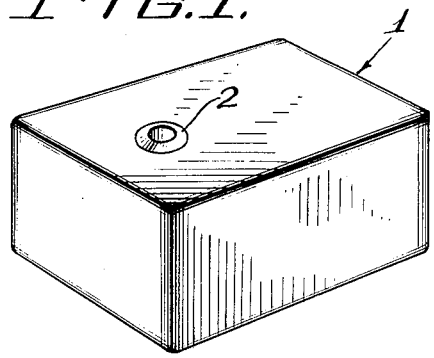
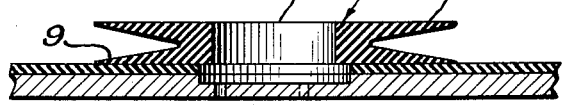
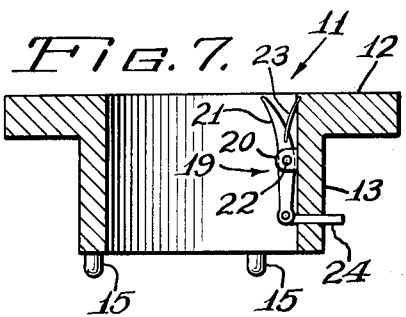
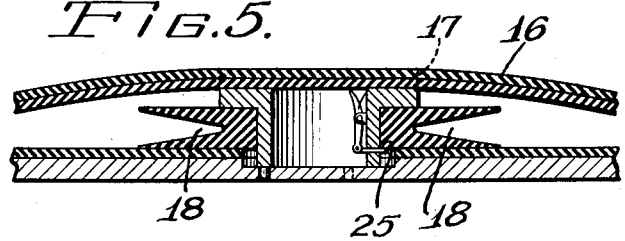
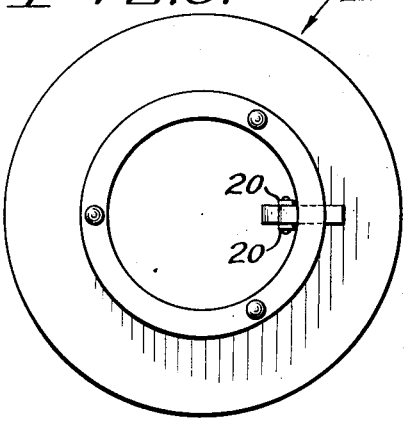
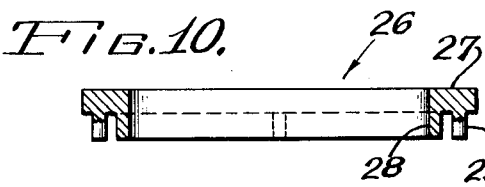
Inventor: James Kontos
By Gary, Desmond & Parker
Attys.

United States Patent Office

2,731,089
Patented Jan. 17, 1956

2,731,089

PROTECTOR FOR FLEXIBLE FITTINGS FOR FLEXIBLE TANKS

James Kontos, Chicago, Ill.

Application August 8, 1952, Serial No. 303,303

2 Claims. (Cl. 164—78)

This invention relates to improvements in protectors for tank fittings and refers particularly to a protector, which may be employed when making a flexible tank such as an airplane fuel tank, for preventing the cutting, burning or rupturing of the tank fitting during the manufacture of the tank.

In fuel tanks for airplanes which are constructed of rubber or other flexible material the fittings for the inlet and outlet of the tank are also frequently made of rubber or other relatively soft material. In the manufacture of the tanks such fittings are frequently cut, burnt or otherwise mutilated to the extent that the fitting must be replaced, an exceedingly expensive proceeding.

My present invention comprises a protector for such fittings which may be employed during the manufacture of the tanks, the protector functioning to prevent the cutting or mutilation of the fitting during the making of the tank.

Another important feature of my protector in addition to its function of protecting the fitting from injury, is its use as a fitting centering or locating device, which function inherently follows its use as a fitting protector.

The objects and advantages of my invention will be apparent from the accompanying drawing and following detailed description.

In the drawing,

Fig. 1 is a perspective view of a tank having a fitting.

Figs. 2, 3, 4, 5 and 6 are sectional views through a portion of a tank at the fitting, illustrating sequential steps in building the tank and employing the fitting.

Fig. 7 is an enlarged sectional view of my fitting protector.

Fig. 8 is a bottom plan view of the fitting protector shown in Fig. 7.

Fig. 9 is a modification of my fitting protector suitable for a different shaped fitting.

Fig. 10 is a sectional view taken on line 10—10 of Fig. 9.

Referring in detail to the drawing, 1 indicates an airplane fuel tank or the like which is constructed of rubber or other pliable, resilient material, the tank being provided with a fitting 2 in which a pipe connection may be made as a feed or discharge for the tank. Tanks of this general description are well known and are frequently used as wing tanks for airplanes where they may take many odd and irregular shapes conformable to the available spaces in the airplane wing. Having flexible walls, they may be squeezed through small openings and may be permitted to expand into and conform with a predetermined space for which they are designed.

In the manufacture of such tanks a rigid form is first made of plaster of Paris or other suitable material, the form being shaped similar to the intended finished flexible walled tank. 3 indicates a portion of such a form adjacent the location 4 where the intended fitting is adapted to be positioned. At the intended opening the form may be cut away, as at 5 in Fig. 2, the approximate shape of the intended opening.

Over the form 3 an inner liner 6 is wrapped, the liner comprising a strip or strips or a sheet or sheets of flexible rubber or rubberized fabric. The next step in the manufacturing procedure is to position the fitting upon the wrapped form 3, the fitting comprising a flexible rubber disc 7 having spaced annular flanges 8 and 9, being the upper and lower flanges respectively. The central portion of the disc 7 is provided with an aperture 10 which is intended to be the opening into which a feed or discharge pipe (not shown) is intended to be positioned.

Heretofore, at this stage in the process of manufacture of the tank an outer liner, comprising one or more layers of rubber or rubberized fabric, have been wrapped around not only the tank proper, but also over the fitting 7. In thus wrapping over the fitting, the outer liner has not only completely obscured the fitting from view, but has made tactual location of the fitting difficult, particularly where the outer liner comprises a plurality of relatively thick layers. Subsequently, the outer liner is cut by shears, a hot or cold knife or the like, at the position where the operator supposes the fitting to be located so that the fitting may be exposed. It has been found that, in thus blindly cutting the outer layer, the fitting, itself being of flexible, soft material, is frequently cut, burnt or otherwise mutilated, requiring a major tank-rebuilding project to replace the injured fitting.

To eliminate the possibility of injuring or mutilating the soft fitting 7 when the outer liner of the tank is cut to expose the fitting, I contemplate the use of a protector 11 shown in detail in Figs. 7 and 8. The protector 11 may be constructed of metal, such as, aluminum, steel or brass or it may be constructed of a relatively hard plastic material which is sufficiently tough and strong to withstand the abuse which it may receive from the cutting knives or shears during the outer liner cutting operation. For purposes of example, the protector is shown as one which may be used in conjunction with a circular fitting such as the fitting 7 and the protector comprises a circular flange portion 12 and a joined tubular throat portion 13.

In constructing the form 3 a plurality of centering apertures 14 may be provided in the wall of the form adjacent the cut-away portion 5. The purpose of these apertures is to receive correspondingly positioned pins 15 which are carried at the lower end of the throat portion 13 of the protector. In employing the protector, the protector 11 comes into use at that stage of the tank-making process following the positioning of the fitting 7 over the intended opening. With the parts positioned as shown in Fig. 4, the protector 11 is inserted in the aperture 10, the outer diameter of the throat portion 13 being slightly smaller than the diameter of the opening 10. The protector is thus telescopically moved through the opening and the pins 15 threaded into engagement with the centering apertures 14. The protector thus functions to center and anchor the fitting 10 at the desired portion of the tank principally by means of the engagement of the pins 15 in the apertures 14. When the protector is thus positioned the flange portion 12 overlies a portion of the fitting, as shown best in Fig. 5. Thereafter, in the manufacture of the tank an outer liner 16 of rubber, rubberized fabric or the like may be wrapped around the tank and may also be wrapped over the fitting which now, however, is protected by the protector 11.

The outer liner 16 which may comprise one or more layers of rubber or rubberized fabric may then be cut along the lines 17 adjacent the periphery of the flange portion 12 of the protector. It can readily be seen that if the cutting operation is not performed in a precise or exact manner, which is usually the case, the shears or cutting knife will come into contact with the flange portion 12 of the protector and will thus be prevented from gouging or mutilating the fitting 7. In addition, by virtue of the fact that the flange portion 12 of the protector extends above the surface of the fitting, the periphery of the flange portion 12 will, when the outer liner 16 is wrapped thereover provide a ridge which can be tactually recognized by the operator thus assisting him in making the cut.

After the outer liner has been cut along the lines 17 the edge portions of the liner may be positioned in the space 18 between the upper and lower flanges 8 and 9 of the fitting. The upper flange 8 may then be moved downwardly into contact with the upper surface of the outer liner and held in this fashion by cement, tape or the like to securely join the outer liner and the fitting. The protector 11 may then be removed and the entire assembly comprising the various liners and the fitting may be vulcanized, the relationship of the fitting and outer liners after vulcanization being shown in Fig. 6. Thereafter steps may be taken to remove the form from the interior of the tank, that is the form may be broken up and dissolved and removed from the interior of the tank. Of course, this latter operation does not constitute any part of my invention and is conventional in the manufacture of this general type of tank.

In order to prevent the protector 11 from being inadvertently removed from its position within the fitting during the wrapping operation wherein the outer liner is wrapped over the tank proper and over the fitting, a latch mechanism 19 is employed. On the inner wall of the throat portion 13 a pair of lugs 20 may be positioned which may form a fulcrum having a lever 21, a pin 22 being positioned through the lugs 20 and an intermediate portion of the lever 21. A leaf spring 23 may bear at one end against a portion of the lever 21 and at the opposite end may be anchored in the inner wall of the protector thereby tending to urge the lever 21 in a counter-clockwise direction about the pivot pin 22, as viewed in Fig. 7. At the opposite end of the lever, a keeper 24 is pivotally carried, said keeper extending through an aperture provided in the wall of the throat portion 13 and when the protector is in operative position over the fitting, the keeper 24 engages the lower side of the fitting as shown best at 25 in Fig. 5.

My invention in its broadest aspects contemplates the use of the protector 11 with or without the latch mechanism 19. Further, for purposes of example the protector has been illustrated and described as being employed with a fitting having a circular opening 10. It is to be understood, of course, that the protector may be employed with a fitting having any desired shape of opening in which case the throat portion of the protector and the flange portion thereof will conform generally with the shape of the fitting.

Referring particularly to Figs. 9 and 10, a modification of my invention is shown wherein the centering means or anchoring means for the protector is displaced laterally from the throat portion of the protector. In Figs. 9 and 10 protector 26 is illustrated. The protector 26 comprises a flange portion 27 and a throat portion 28. For purposes of illustration, the protector 26 is shown as being substantially rectangular and is adapted to cooperate with a rectangular type of fitting. Of course, the general type of protector illustrated in Figs. 9 and 10 may be circular or may take any desired shape.

Depending from the lower surface of the flange portion 27 of the protector 26 is a plurality of pins 29 which are spaced from each other and are also spaced from the outer walls of the throat portion 28. In employing the protector 26 the fitting with which it is used will be provided with centering apertures to receive the pins 29, that is, the centering apertures when the protector 26 is used are provided in the fitting itself whereas the centering apertures 14 when the protector 11 is employed are provided in the form.

The protector 26, of course, is constructed of a material such as hereinbefore described in conjunction with the protector 11 and the flange portion 27 of the protector affords protection for the fitting with which it may be used during the operation of cutting the outer liner of the tank.

It is apparent that other modifications of my invention may be suggested to those skilled in the art and hence I do not wish to be limited except as necessitated by the appended claims.

I claim as my invention:

1. An open ended protector for a relatively soft fitting for the opening of a flexible closed container having an outer liner and wherein the fitting has a top surface and an opening which extends downwardly from said top surface and registers with the opening of the container and overlies the edge portions of the container which define the container opening including a portion of the outer liner adjacent said opening, said protector comprising a relatively flat flange portion which overlies a portion of the top surface of the fitting so that it does not completely cover said top surface and over which said liner is adapted to be disposed, said protector having a throat portion lying snugly within the opening of the fitting and terminating substantially flush with said flange portion, and means on the protector for detachably engaging the fitting and for holding the fitting and the protector together while the liner is cut around said flange, said protector being constructed of relatively hard material.

2. An open ended protector of relatively hard material for a relatively soft fitting for the opening of a flexible closed tank which has been made on a rigid form, said tank having an outer liner and wherein the fitting has a top surface and an opening which extends downwardly from said top surface and registers with the opening of the tank and overlies the edge portions of the tank which define the tank opening including a portion of the outer liner adjacent said opening, said protector comprising a relatively flat portion which overlies a portion of the top surface of the fitting so that it does not completely cover said top surface and over which said liner is adapted to be disposed, said protector having a throat portion lying snugly within the opening of the fitting and terminating substantially flush with said flange portion, and means carried by the protector for removably engaging said form for locating the fitting on the form while the liner is cut around said flange.

References Cited in the file of this patent

UNITED STATES PATENTS

| | | |
|---|---|---|
| 101,222 | Burgess et al. | Mar. 29, 1870 |
| 1,341,445 | Stanley | May 25, 1920 |
| 1,467,971 | Wyman | Sept. 11, 1923 |
| 1,584,370 | Green | May 1, 1926 |
| 2,072,426 | Kraft | Mar. 2, 1937 |
| 2,459,747 | Kolbe | Jan. 18, 1949 |
| 2,459,752 | Wilson et al. | Jan. 18, 1949 |
| 2,580,772 | Hawkins | Jan. 1, 1952 |